United States Patent [19]

Matsuo et al.

[11] Patent Number: 4,761,459

[45] Date of Patent: Aug. 2, 1988

[54] SURFACE MODIFIER

[75] Inventors: Masashi Matsuo; Nobuyuki Yamagishi; Takashige Maekawa, all of Yokohama, Japan

[73] Assignee: Asahi Glass Company Ltd., Tokyo, Japan

[21] Appl. No.: 57,039

[22] Filed: Jun. 3, 1987

[30] Foreign Application Priority Data

Jun. 3, 1986 [JP] Japan ................... 61-127272

[51] Int. Cl.[4] .................................. C08F 283/00
[52] U.S. Cl. .................. 525/479; 526/224; 528/30
[58] Field of Search ............ 526/224; 525/479; 528/30

[56] References Cited

U.S. PATENT DOCUMENTS

| 3,278,352 | 10/1966 | Erickson | 528/376 |
|---|---|---|---|
| 3,772,258 | 11/1972 | Lachowicz | 556/224 |
| 3,931,092 | 1/1976 | Ramlow et al. | 556/224 |
| 4,098,742 | 7/1978 | Meuller | 524/588 |

FOREIGN PATENT DOCUMENTS

| 81278 | 5/1985 | Japan . |
|---|---|---|
| 190408 | 9/1985 | Japan . |

*Primary Examiner*—Melvyn I. Marquis
*Attorney, Agent, or Firm*—Oblon, Fisher, Spivak, McClelland & Maier

[57] ABSTRACT

A surface modifier comprising a block copolymer obtained by polymerizing a polyfluoroalkyl group-containing compound in the presence of a chain transfer agent composed of a polysiloxane having a mercapto group at its terminal, said block copolymer containing polymer segments of said polysiloxane and polymer segments of said compound, as essential components.

2 Claims, No Drawings

SURFACE MODIFIER

The present invention relates to a surface modifier comprising, as the essential component, a block copolymer containing fluorine-containing segments and siloxane segments.

In the surface modification of a solid, it has been known to improve the surface properties by using a fluorine-containing polymer or oligomer, or a reactive monomer. The surface properties to be improved include water repellency, oil repellency, stainproofing properties, lubricating properties, non-adhesiveness, etc.

Among such fluorine-containing surface modifiers, an acrylic copolymer, a polyether copolymer and a urethane oligomer are known as a polymer or oligomer type modifier. However, modifiers composed mainly of such a polymer or oligomer are hardly capable of simultaneously satisfying mutually opposing properties such as flexibility and durability, solvent resistance and water resistance, or flexibility and stainproofing properties. It has been proposed to blend two or more polymers or oligomers to satisfy such mutually opposing properties, but there has been a problem in the compatibility.

On the other hand, graft or block copolymerization of different polymers or oligomers is used as an important means for improving the physical properties of the copolymer thereby obtained. For instance, it is known to use a (meth)acrylate having a silicone skeleton, as a monomer, in the composition of an acrylate copolymer (Japanese Unexamined Patent Publication No. 190408/1985). This treating agent is a graft copolymer and is capable of imparting flexibility when applied for the treatment of fibers. However, it is inferior in providing durability such as dry cleaning resistance. On the other hand, a fluorine-containing urethane compound-organosiloxane composition as disclosed in U.S. Pat. No. 4,098,742 or in Japanese Unexamined Patent Publication No. 81278/1985, is capable of imparting durability, but is inferior in providing flexibility. As a technique in which a block copolymer is used as a surface modifier for the treatment of fibers, a SR (soil release) treating agent is known, in which a polyalkyleneoxide-acrylate copolymer is used (U.S. Pat. No. 3,278,352). However, with a block copolymer of this type, it has still been difficult to simultaneously satisfy the durability (washability) and the flexibility, although the soil release properties can thereby be imparted.

As a result of extensive studies to overcome the above-mentioned drawbacks of the conventional treating agents, it has now been found that a block copolymer comprising fluorine-containing segments and siloxane segments exhibits excellent surface modifying effects and yet is capable of satisfying the above-mentioned mutually opposing properties.

The present invention provides a novel surface modifier comprising a block copolymer obtained by polymerizing a polyfluoroalkyl group-containing compound in the presence of a chain transfer agent composed of a polysiloxane having a mercapto group at its terminal, said block copolymer containing polymer segments of said polysiloxane and polymer segments of said compound, as essential components.

Now, the present invention will be described in detail with reference to the preferred embodiments.

In the present invention, there is no particular restriction as to the polyfluoroalkyl group-containing polymerizable compound, so long as it is capable of being polymerized by chain transfer polymerization by a chain transfer agent composed of a polysiloxane. However, polyfluoroalkyl group-containing unsaturated esters are particularly preferred. As such unsaturated esters, the following acrylates or methacrylates are preferred. The polyfluoroalkyl group preferably has a carbon number of from 3 to 21, and particularly preferred is a perfluoroalkyl group. The one having from 6 to 18 carbon atoms is particularly preferred, when the solubility in an organic solvent and the surface modifying properties are taken into consideration. Preferred specific examples include the following acrylates or methacrylates having polyfluoroalkyl groups at their terminals.

CF$_3$(CF$_2$)$_4$CH$_2$OCOC(CH$_3$)=CH$_2$
CF$_3$(CF$_2$)$_6$(CH$_2$)$_2$OCOC(CH$_3$)=CH$_2$
CF$_3$(CF$_2$)$_7$CH$_2$CH$_2$OCOCH=CH$_2$

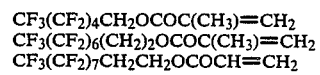

CF$_3$(CF$_2$)$_7$SO$_2$N(C$_3$H$_7$)(CH$_2$)$_2$OCOCH=CH$_2$
CF$_3$(CF$_2$)$_7$(CH$_2$)$_4$OCOCH=CH$_2$
CF$_3$(CF$_2$)$_7$SO$_2$N(CH$_3$)(CH$_2$)$_2$OCOC(CH$_3$)=CH$_2$
CF$_3$(CF$_2$)$_7$SO$_2$N(C$_2$H$_5$)(CH$_2$)$_2$OCOCH=CH$_2$
CF$_3$(CF$_2$)$_7$CONH(CH$_2$)$_2$OCOCH=CH$_2$

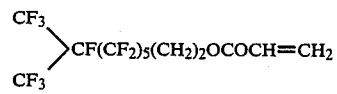

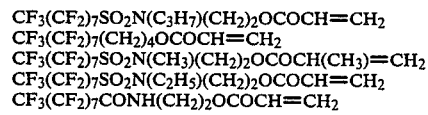

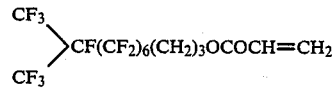

CF$_3$(CF$_2$)$_8$(CH$_2$)$_2$OCOCH=CH$_2$
CF$_3$(CF$_2$)$_8$(CH$_2$)$_2$OCOC(CH$_3$)=CH$_2$
CF$_3$(CF$_2$)$_8$CONH(CH$_2$)$_2$OCOC(CH$_3$)=CH$_2$

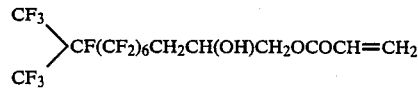

H(CF$_2$)$_{10}$CH$_2$OCOCH=CH$_2$
CF$_2$Cl(CF$_2$)$_{10}$CH$_2$OCOC(CH$_3$)=CH$_2$

In order to improve the adhesive properties of the copolymer constituting the surface modifier of the present invention to a substrate, the crosslinking properties within the copolymer molecules, or the film-forming properties, flexibility, etc. of the copolymer, it is preferred to copolymerize the following copolymerizable compounds to the above-mentioned polyfluoroalkyl group-containing polymerizable compound. Namely, it is possible to copolymerize one or more polymerizable compounds containing no polyfluoroalkyl group, as constituting units of the copolymer, such as ethylene vinyl acetate, vinyl chloride, vinyl fluoride, vinylidene halide, styrene, α-methylstyrene, p-methylstyrene, acrylic acid and its alkyl ester, methacrylic acid and its alkyl ester, a poly(oxyalkylene) (meth)acrylate, (meth)acrylamide, diacetone (meth)acrylamide, methylol-modified diacetone (meth)acrylamide, N-methylol (meth)acrylamide, a vinyl alkyl ether, a halogenated alkyl vinyl ether, a vinyl alkyl ketone, butadiene, isoprene, chloroprene, glycidyl (meth)acrylate, 2-hydroxyethyl (meth)acrylate, aziridinylethyl (meth)acrylate, benzyl (meth)acrylate, isocyanatoethyl (meth)acrylate, cyclohexyl (meth)acrylate, 2-ethylhexyl (meth)acrylate, maleic anhydride, aziridinyl (meth)acrylate, a polysiloxane-containing (meth)acrylate, and N-vinylcarbazole.

Such copolymerizable compounds may be copolymerized in an amount of from 0 to 70 mol%, preferably from 1 to 50 mol%, relative to the polyfluoroalkyl group-containing polymerizable compound. If the amount is less than 1 mol%, no adequate effect for the improvement of the flexibility, adhesiveness, film-forming properties and crosslinking properties will be obtained. On the other hand, if the amount exceeds 50 mol%, the surface modifying effects tend to deteriorate.

In the present invention, the chain transfer agent composed of a polysiloxane having a mercapto group at its terminal, is represented by the following formula:

wherein A is a monovalent organic group having a mercapto group at its terminal, $0<a<4$, R is a substituted or unsubstituted monovalent hydrocarbon group having not higher than 20 carbon atoms, $0 \leq b<4$, and $0<a+b<4$.

This polysiloxane is a silicone containing dimethylsiloxane, methylphenylsiloxane or an alkylmethylsiloxane as a constituting unit, and essentially contains mercapto groups in its molecule within the above-mentioned range.

Further, it may contain a crosslinkable group, a reactive group or a substitutional group having a reactive group curable by a curing catalyst. Specific examples of such compounds will be given. Here, Me represents a methyl group.

more preferably within ranges of $5 \leq 1, m, n \leq 75$, and $1 \leq r \leq 10$.

A includes, for example, the following organic groups:

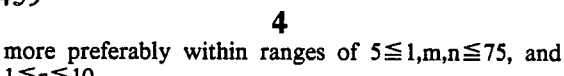 (esterification of a OH-containing silicone with HSCH$_2$COOH)

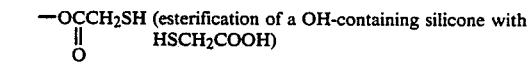 (esterification of a COOH-containing silicone with HSC$_2$H$_4$OH)

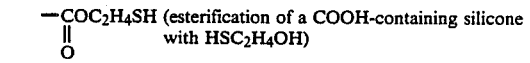 (reaction of an epoxy-containing silicone with HSC$_2$H$_4$OH/base)

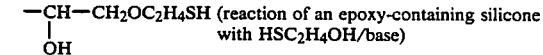 (reaction of a halogen-containing silicone with HSC$_2$H$_4$OH/base)

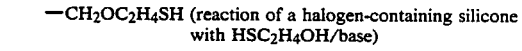 (hydrosilylation of the terminal H of siloxane with a double bond-containing mercapto compound)

R which may be the same or different is a substituted or unsubstituted monovalent hydrocarbon group having not higher than 20 carbon atoms, which includes an alkyl group, a cycloalkyl group and an aralkyl group. The substituent includes a halogen such as F, Cl or Br, an amino group, an epoxy group and a cyano group. In the case of a fluorine-containing polysiloxane wherein a part of R is, for example, —C$_2$H$_4$R$_f$ (R$_f$ is a polyfluoroalkyl group having from 1 to 21 carbon atoms), the compatibility with the polyfluoroalkyl group-containing copolymerizable compound increases, whereby the efficiency for emulsion polymerization improves remarkably.

The molar ratio of the polymer segments of the polyfluoroalkyl group-containing polymerizable compound to the polymer segments of the polysiloxane in the block copolymer of the present invention is preferably from 0.1 to 10, more preferably from 0.5 to 5. If the polysiloxane is excessive, the surface modifying effects tend to be low, or the copolymerization tends to hardly proceed. On the other hand, if the ratio of polysiloxane

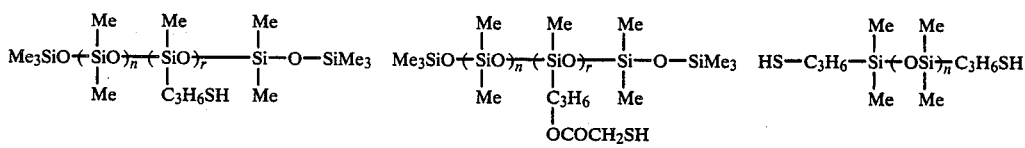

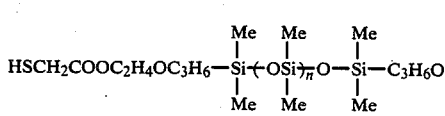 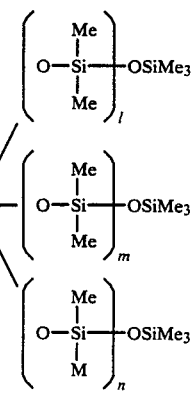

In the above formulas, l, m, n and r are integers preferably within ranges of $0 \leq 1, m, n \leq 150$, and $1 \leq r \leq 50$, is too small, it becomes difficult to simultaneously obtain the mutually opposing properties such as the solvent resistance and the flexibility, etc.

It is important to conduct chain transfer polymerization so that the molar amount of the polymer segments of the polyfluoroalkyl group-containing polymerizable compound per one mercapto group is from 2 to 100, preferably from 10 to 30. If the amount is too small, the effectiveness tends to be low. On the other hand, if the amount is excessive, a homopolymer of the polyfluoroalkyl group-containing polymerizable compound will be formed in addition to the block copolymer, whereby it becomes difficult to simultaneously obtain the mutually opposing properties.

Various systems and conditions for the polymerization reaction may be employed for the production of the copolymer of the present invention. Namely, any one of the polymerization systems such as bulk polymerization, solution polymerization, suspension polymerization, emulsion polymerization, radiation polymerization or photo polymerization, may be employed. For instance, a method may be employed wherein a mixture of compounds to be copolymerized is emulsified in water in the presence of a surface active agent and copolymerized under stirring. As a polymerization initiating source, a polymerization initiator such as an organic peroxide, an azo compound or a persulfate, or an ionizable radiation such as γ-rays, may be employed. As the surfactant, almost any one of various anionic, cationic or nonionic emulsifiers may be employed. Thus, a method may be employed wherein the polymerizable starting compounds are dissolved in a suitable organic solvent and subjected to solution polymerization by means of a polymerization initiating source (such as a peroxide or an azo compound soluble in the organic solvent used, or an ionizable radiation). The solvent suitable for the solution polymerization includes trichlorotrifluoroethane, tetrachlorodifluoroethane and methylchloroform. By such a solution polymerization or emulsion polymerization, an aerosol type, organic solvent type or latex type surface modifier can directly be produced.

The surface modifier of the present invention can be applied to an object to be treated in an optional manner depending upon the type of the object to be treated, or upon the type of the formulation such as the solvent solution type or the aerosol type. For instance, in the case of an aqueous emulsion type or solvent solution type, a conventional method for coating treatment such as dipping or coating may be employed to apply it on the surface of the object to be treated, followed by drying. If necessary, it may be applied together with a suitable crosslinking agent, followed by curing. In the case of an aerosol type surface modifier, the application can be made by simply spraying it on the object to be treated, whereupon it immediately dries up to provide adequate properties.

The surface modifier of the present invention can be used for various applications by virtue of its excellent surface modifying effects such as water repellency, oil repellency, stainproofing properties, lubricating properties and non-adhesiveness, for instance, as a water and oil repellant, a stainproofing agent, a lubricant, a releasing agent, an anti-blocking agent, an additive for coating compositions, and a leveling agent or a moisture proofing improver.

There is no particular restriction as to the object to be treated by the surface modifier of the present invention, and various objects may be mentioned, including, for instance, fiber fabrics, glass, paper, wood, leather, wool, asbestos, bricks, cement, ceramics, metals and oxides, porcelains, plastics, coated surfaces and plasters. The fiber fabrics include fabrics of animal or plant natural fibers such as cotton, linen, wool or silk; fabrics of various synthetic fibers such as a polyamide, a polyester, a polyvinyl alcohol, a polyacrylonitrile, a polyvinyl chloride or a polypropylene; fabrics of semi-synthetic fibers such as rayon or acetate; fabrics of inorganic fibers such as glass fibers or asbesto fibers; and fabrics of mixtures of such fibers.

Now, the present invention will be described in further detail with reference to Examples. However, it should be understood that the present invention is by no means restricted to such specific Examples.

REFERENCE EXAMPLE 1

Into a 300 ml four-necked flask equipped with a stirrer and a Dean-Stark water separator, 15 g of a silicone having the formula:

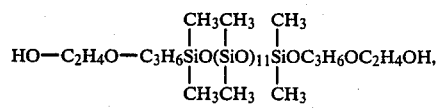

2.7 g of thioglycol, 0.2 g of p-toluene sulfonic acid and 200 ml of toluene were introduced, and reacted under reflux for 4 hours. As azeotropic water, 0.54 g of water was distilled.

After the removal of toluene, the residue was dissolved in 1,1,2-trichloro-trifluoroethane (hereinafter referred to simply as R-113). After washing once with 20 ml of a 1% sodium carbonate aqueous solution, the solvent was distilled off from the organic layer to obtain a transparent oil (15.3 g, yield: 95.0%, IR: 1745 cm$^{-1}$ (S)).

REFERENCE EXAMPLE 2

30 g of a silicone having the formula:

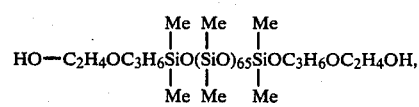

1.3 g of thioglycolic acid, 0.3 g of p-toluene sulfonic acid and 200 ml of toluene were charged, and the esterification reaction was conducted in the same manner as in Reference Example 1. After 0.22 g of water was distilled off, the same after-treatment was conducted (yield: 97.0).

REFERENCE EXAMPLE 3

Preparation of a Terminal-$C_3H_6SH$ Containing Siloxane Chain Transfer Agent

Into a 100 ml reactor equipped with a stirrer, 10.0 g (45.0 mmol) of hexamethylcyclotrisiloxane having the formula:

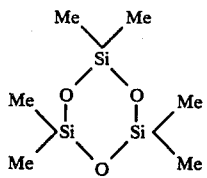

and 4.5 g (16.7 mmol) of 1,3-bis(3-mercaptopropyl)-tetramethyldisiloxane having the formula:

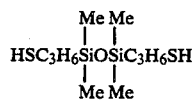

were charged, and heated to 60° C. or higher. When the content became homongeneous, 0.20 g of sulfuric acid was added thereto, and the mixture was reacted for equilibrium at 100° C. for 5 hour. Then, 50 ml of R-113 was added to obtain a R-113 solution, which was washed twice with 20 ml of water. Then, R-113 was evaporated to obtain 12.8 g of a crude product. From the crude product, volatile components were removed under a reduced pressure of 0.1 mmHg at 180° C. over a period of 2 hours to obtain 8.6 g of purified siloxane (SH content: 5.0%, yield: 59.3%)

REFERENCE EXAMPLE 4

Preparation of

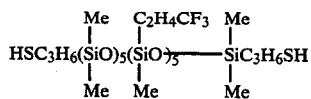

Into a 100 ml reactor equipped with a stirrer, 7.8 g (35.0 mmol) of hexamethylcyclotrisiloxane, 16.4 g (35.0 mmol) of 1,3,5-tris(3,3,3-trifluoropropyl)-1,3,5-trimethylcyclotrisiloxane having the formula:

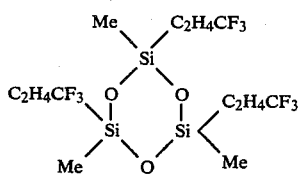

and 6.9 g (24.6 mmol) of 1,3-bis(3-mercaptopropyl)-tetramethyldisiloxane were charged, and heated to 60° C. or higher. When the content became homogeneous, 0.32 g of sulfuric acid was added, and the subsequent operation was conducted in the same manner as in Reference Example 3 to obtain 22.3 g of purified siloxane (SH content: 4.4%, yield: 71.7%).

EXAMPLE 1

Into a 100 ml ampoule, 20 g (35 mmol) of $C_9$—$F_{19}$—$C_2H_4OCOCH=CH_2$ (hereinafter referred to simply as FA), 1.15 g (1.0 mmol) of the mercapto group-containing silicone prepared in Reference Example 1, 49.4 g of R-113 and 0.2 g (0.3 mmol) of α,α-azobisisobutyronitrile (AIBN) were charged, and after flushing thoroughly with nitrogen, polymerized at 60° C. for 13 hours. The conversion of FA was confirmed to be at least 99% by gas chromatography.

The copolymer solution thus obtained was diluted with R-113 to a solid content of 0.4%. A PET (doeskin) cloth was dipped therein, and dried in air and then in hot air at 100° C. for 3 minutes. The treated cloth had a flexible texture, and a water repellency of 100 (JIS L-1005) and an oil repellency of 7 (AATCC TM-118-1966). After washing (JIS L-0217-103) three times [hereinafter referred to simply as HL3] and after dry cleaning (JIS L-1092-322) three times [hereinafter referred to simply as DC3], the oil repellency/the water repellency was 5/100 and 5/100, respectively.

EXAMPLES 2 to 9

FA, a methacrylate containing no fluorine and a mercapto group-containing silicone prepared in one of Reference Examples 1 to 4 were polymerized in the proportions as identified in Table 1 in the same manner as in Example 1, and a PET cloth was treated therewith. The results are shown in Table 1.

COMPARATIVE EXAMPLE 1

Only FA was charged as the monomer for polymerization, and the polymerization was conducted in the same manner as in Example 1, and a PET cloth was treated therewith. [Polymerization scale FA: 20.0 g (35 mmol), R-113: 45 g, AIBN: 0.2 g]

COMPARATIVE EXAMPLE 2

As the polymerizable monomer, 20 g (35 mmol) of FA and 3.0 g (0.91 mmol) of a silicone methacrylate having the formula:

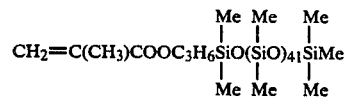

were charged, and 47.0 g of R-113 and 0.2 g of AIBN were added. Then, the polymerization was conducted in the same manner as in Example 1, and then a PET cloth was treated therewith.

TABLE 1

| Example | FA (mmol) | Other monomer (mmol) | Silicone (mmol) | Texture* | Initial OR/WR | DC 3 | HL3 |
|---|---|---|---|---|---|---|---|
| 2 | 35 | 0 | Reference Example 1 0.5 | Flexible | 6/100 | 6/100 | 3/60 |
| 3 | 35 | 0 | Reference Example 2 0.5 | Flexible | 6/100 | 5+/80+ | 3+/60 |
| 4 | 35 | 0 | Reference Example 2 0.1 | Flexible | 6/100 | 5/80+ | 3+/60 |
| 5 | 25 | StMA 10 | Reference Example 1 1.0 | Flexible | 6/100 | 3/70 | 5/100 |
| 6 | 35 | AZMA 3 | Reference Example 1 1.5 | Flexible | 6/100 | 6/100 | 6/100 |

TABLE 1-continued

| | FA (mmol) | Other monomer (mmol) | Silicone (mmol) | Texture* | Initial | OR/WR DC 3 | HL3 |
|---|---|---|---|---|---|---|---|
| 7 | 35 | SMA-1 3 | Reference Example 1 1.5 | Flexible | 6/100 | 5/80 | 5/100 |
| 8 | 35 | 0 | Reference Example 3 1.0 | Flexible | 6/100 | 6/100 | 5/90 |
| 9 | 35 | 0 | Reference Example 4 1.0 | Flexible | 6/100 | 6/100 | 6/90 |
| Comparative Example 1 | 35 | 0 | 0 | Coarse and hard | 6/100 | 5/80 | 4/50 |
| Comparative Example 2 | 35 | SAM-2 0.94 | 0 | Slightly hard | 6/100 | 3/50— | 5—/60 |

*Texture was evaluated by touch sense.

StMA ... $C_{18}H_{37}OCOC(CH_3)=CH_2$

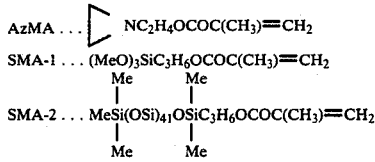

SMA-1 ... $(MeO)_3SiC_3H_6OCOC(CH_3)=CH_2$

SMA-2 ... 
$$\begin{array}{cc} Me & Me \\ | & | \\ MeSi(OSi)_{41}OSiC_3H_6OCOC(CH_3)=CH_2 \\ | & | \\ Me & Me \end{array}$$

The surface modifier of the present invention comprising the block copolymer as an essential component, is capable of imparting high surface modifying effects such as water repellency, oil repellency, stainproofing properties, lubricating properties and non-adhesiveness to a substrate. Particularly, when used as a water and oil repellant for fibers, it serves as a treating agent capable of imparting flexibility and durability which are hardly simultaneously imparted by conventional treating agents.

We claim:

1. A surface modifier comprising a block copolymer obtained by polymerizing a polyfluoroalkyl group-containing compound selected from the group consisting of acrylates and methacrylates having a polyfluoroalkyl group at its terminal in the presence of a chain transfer agent composed of a polysiloxane having a mercapto group at its terminal represented by the following formula:

wherein A is a monovalent organic group having a mercapto group at its terminal, $0<a<4$, R is a substituted or unsubstituted monovalent hydrocarbon group having not higher than 20 carbon atoms, $0 \leq b < 4$, and $0 < a+b < 4$, said block copolymer containing segments of said polysiloxane and segments of said compound, as essential components.

2. The surface modifier according to claim 1, wherein the molar ratio of the segments of said compound to the segments of said polysiloxane in the block copolymer is from 0.1 to 10.

* * * * *